(12) United States Patent
Onken

(10) Patent No.: US 8,964,941 B2
(45) Date of Patent: Feb. 24, 2015

(54) BEARING SYSTEM FOR A ROTARY ANODE OF AN X-RAY TUBE

(75) Inventor: Volker Onken, Kaltenkirchen (DE)

(73) Assignee: Koninklijke Philips N.V., Eindhoven (NL)

( * ) Notice: Subject to any disclaimer, the term of this patent is extended or adjusted under 35 U.S.C. 154(b) by 302 days.

(21) Appl. No.: 13/638,043

(22) PCT Filed: Mar. 28, 2011

(86) PCT No.: PCT/IB2011/051298
§ 371 (c)(1),
(2), (4) Date: Sep. 28, 2012

(87) PCT Pub. No.: WO2011/121517
PCT Pub. Date: Oct. 6, 2011

(65) Prior Publication Data
US 2013/0022174 A1    Jan. 24, 2013

(30) Foreign Application Priority Data
Mar. 31, 2010  (EP) .................................... 10158748

(51) Int. Cl.
*H01J 35/10* (2006.01)
*F16C 23/04* (2006.01)

(52) U.S. Cl.
CPC .............. *H01J 35/101* (2013.01); *F16C 23/04* (2013.01); *H01J 2235/1006* (2013.01); *H01J 2235/1046* (2013.01); *H01J 2235/1204* (2013.01); *H01J 2235/1208* (2013.01); *H01J 2235/1266* (2013.01)
USPC ............................................ 378/132; 378/144

(58) Field of Classification Search
CPC ........ F16C 23/04; F16C 43/02; H01J 35/101; H01J 2235/1006; H01J 2235/1046
USPC .................................................. 378/132, 144
See application file for complete search history.

(56) References Cited

U.S. PATENT DOCUMENTS

| 6,064,719 A * | 5/2000 | Vetter et al. .................... 378/132 |
| 6,275,567 B1 | 8/2001 | Hove |
| 6,445,769 B1 | 9/2002 | Panasik et al. |

FOREIGN PATENT DOCUMENTS

| DE | 2327944 | 12/1973 |
| DE | 10220610 | 2/2005 |
| EP | 390784 | 7/1988 |

* cited by examiner

*Primary Examiner* — Michael Maskell

(57) ABSTRACT

The present invention relates to a bearing system (1) for a rotary anode (24) of an X-ray tube (23). The bearing system comprises a shaft (2) for supporting the rotary anode (24), the shaft being surrounded by two swash rings (7). Further, a gimbal ring (4) surrounding the shaft (2) and being arranged in between the two swash rings (7) is provided. This gimbal ring (4) is hingeably connected with the shaft (2) such that the gimbal ring (4) is tiltable relative to a longitudinal axis of the shaft (2). Further, the invention relates to an X-ray tube (19) and an imaging system (15) having such a bearing system (1).

11 Claims, 4 Drawing Sheets

BEARING SYSTEM FOR A ROTARY ANODE OF AN X-RAY TUBE

FIELD OF THE INVENTION

The present invention relates to a bearing system for a rotary anode of an X-ray tube, as well as to an X-ray tube and an imaging system both of which having such a bearing system.

BACKGROUND OF THE INVENTION

X-ray tubes having a rotating anode need sophisticated bearing systems, since the anode disc is turning at a high rotation speed. In advanced X-ray tubes, this bearing system is a fluid metal lubricated system including radial and axial bearings supporting the rotary anode on a shaft.

U.S. Pat. No. 6,064,719 discloses such a rotary anode X-ray tube. The bearing system disclosed therein comprises an axial bearing portion and a radial bearing portion, wherein these bearing portions are connected in such a manner that a symmetry axis of the axial and radial bearing portion can perform a swaying motion about the axis of rotation during rotation of the two bearing members. The axial bearing portion is formed by a ring-shaped disc surrounding the anode shaft. The disc is provided with a bore extending parallel to the disc surface and in which is inserted a pin which is guided through a further bore in the shaft. The central zone of the pin which is situated in the bore in the shaft with a small clearance is round so as to be spherical such that this pin has a finite radius of curvature at said area. This way the disc which is rigidly connected to the pin can be tilted out of a perpendicular position relative to the anode shaft through a small angle in any desirable direction. This movability has positive effects on wear.

SUMMARY OF THE INVENTION

The object of the present invention is to provide an alternative bearing system for a rotary anode of an X-ray tube.

This object is solved with the bearing system according to the independent claim. Advantageous further developments are subject of the dependent claims.

According to an embodiment, a bearing system for supporting a rotary anode of an X-ray tube is provided. This bearing system comprises a shaft for supporting the rotary anode. Preferably, this shaft is hollow for guiding cooling fluid inside along a longitudinal direction. Further, two swash rings surrounding the shaft are provided. Preferably, these two swash rings are directly surrounding the shaft, i.e. there are no other parts arranged between the shaft and the swash rings except from lubrication fluid. Between these two swash rings a gimbal ring is arranged which surrounds the shaft, wherein the gimbal ring is hingeably connected with the shaft such that the gimbal ring is tiltable relative to a longitudinal axis of the shaft. This embodiment has the advantage that no through-hole is required to connect the gimbal parts with the shaft. This maintains the stability of the shaft and gives the opportunity to keep the inside of the shaft hollow, for example for using it as cooling channel, in which cooling fluid is guided.

According to a further embodiment, the gimbal ring is composed of two ring sections. This provides the advantage of a good maintainability since the gimbal ring can be removed easily from the shaft and replaced by a new one.

The invention also provides an X-ray tube and an imaging system comprising a bearing system according to one of the above embodiments.

It may be seen as the gist of the invention to provide an axial bearing for supporting a shaft of a rotary anode for an X-ray tube, the center piece of the axial bearing being two substantially semi-circular gimbal parts which are held between two disc-shaped swash rings, wherein the gimbal parts comprise form-locks (e.g. protrusions) which form a gimbal joint with respect to the shaft.

DETAILED DESCRIPTION OF EMBODIMENTS

Figure 1:
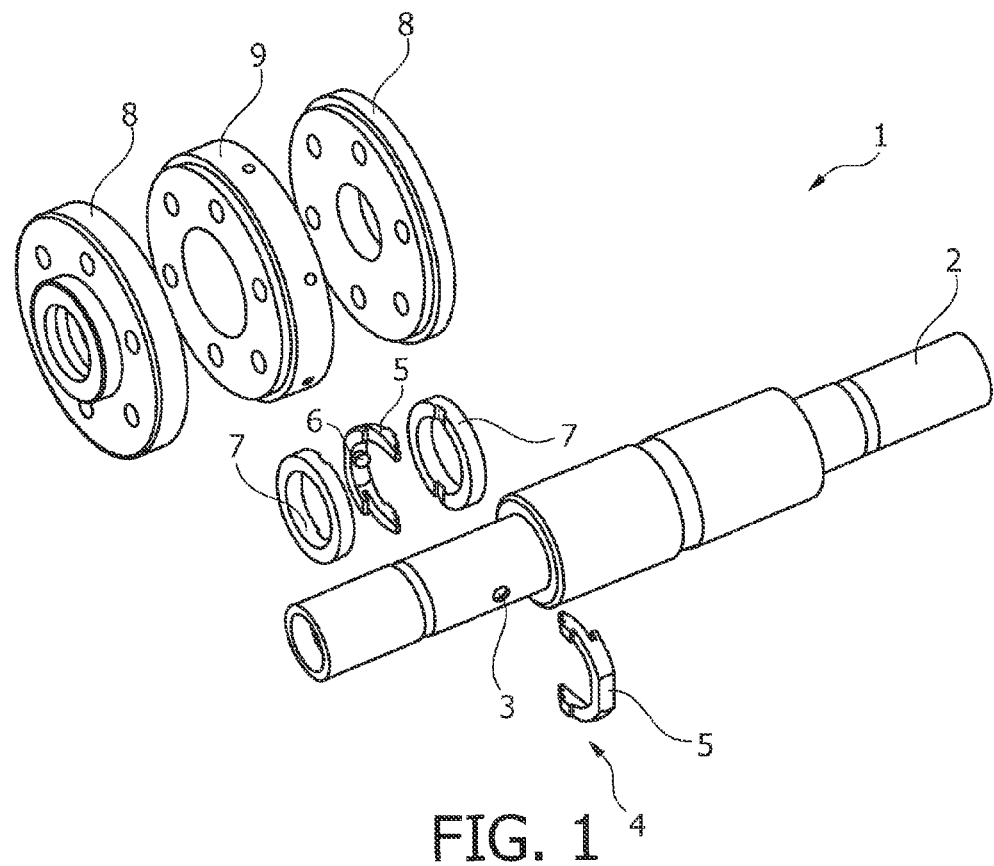
FIG. 1 shows a three-dimensional exploded view of the bearing system according to an embodiment of the invention.

FIG. 1 is a three-dimensional exploded view of the bearing system 1 according to an embodiment of the invention. An anode shaft 2 supports a rotary anode, preferably in form of an anode disc and described in connection with FIG. 5. The shaft 2 has a cylindrical shape with sections of different outer diameters along its longitudinal length, wherein a center portion of the shaft 2 has the largest outer diameter. Adjacent to the center portion, the shaft 2 is provided with a bearing portion which is provided with two blind holes 3. The blind holes 3 are provided diametral and are preferably holes having a basically constant diameter and extending from outside towards the center of the shaft 2 through basically half of the wall thickness of the shaft 2. Further, the bearing system 1 comprises a gimbal ring 4 which is formed by two ring sections 5, each of which is basically semi-circular in shape wherein the circular longitudinal length of each ring section 5 is actually longer than a length which would result from an exact semi-circular shape. The inner diameter of the gimbal ring 4 is a little larger than the outer diameter of the bearing portion of the shaft 2. Each of these ring sections 5 comprises a protrusion 6 which extends from an inner surface (facing towards the shaft 2) of the ring section 5 and corresponds in size and shape to the blind hole 3 provided in the shaft 2. On both sides of the gimbal ring 4, in a longitudinal direction of the shaft 2, a disc-shaped swash ring 7 is provided. The assembly comprising the gimbal ring 4 and the swash rings 7 is encased by two outer rings 8 and a spacer ring 9. In more detail, each of these outer rings 8 is basically disc-shaped with a center hole having a diameter corresponding to the outer diameter of the bearing portion of the shaft 2. The outer diameter of the outer rings 8 basically corresponds to the outer diameter of the spacer ring 9. The spacer ring 9 is also disc-shaped with a center hole having a diameter which is a little larger than the outer diameter of the swash rings 7. When assembling the bearing system 1 shown in FIG. 1, the assembly comprising the gimbal ring 4 and the two swash rings 7 is arranged in between the two outer rings 8 and the spacer ring 9 is also arranged in between the outer rings 8 surrounding the two swash rings 7 and the gimbal ring 4. All components shown in FIG. 1 are preferably formed of molybdenum, and could also be made of tungsten. The explained bearing system 1 forms an axial hydrodynamic bearing system in which liquid lubricant, for example liquid metal, a gallium alloy, galinstan (gallium-indium-tin), an oil lubricant or water is provided at least in between the explained bearing parts. The axial bearing surfaces are formed between the swash rings 7 and the outer rings 8.

Figure 2:
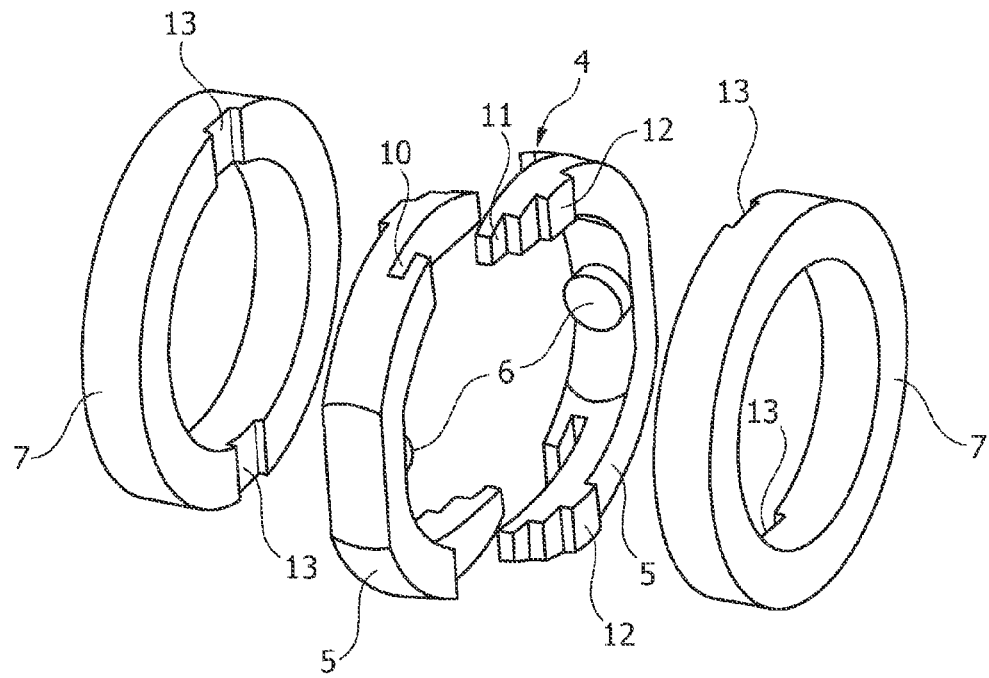
FIG. 2 illustrates a three-dimensional view of some parts of the bearing system of FIG. 1.

FIG. 2 shows the gimbal ring 4 and the swash rings 7 of the bearing system 1 in more detail. As already mentioned above, the gimbal ring 4 comprises two ring sections 5 each of which has a longitudinal length in a circumferential direction such that the end portions of the ring sections 5 overlap each other. In order to realize this overlapping at each end portion, one half of the cross-section of the ring section 5 (the halves when dividing the ring section by a plane which is normal to the longitudinal direction of the shaft 2) is provided with a groove 10 which is extending in a circumferential direction of the ring section 5 and the other half of the cross-section of the end portion is provided with a tooth 11 which also extends in a circumferential direction of the ring section 5 and the shape of which corresponds to the shape of the groove 10. The ring sections 5 are formed identically, this way, when they are arranged opposite to each other, a tooth 11 of one ring section 5 is opposed to a groove 10 of the other ring section 5 such that they mesh with each other. However, it is also possible to design the ring sections 5 non-identical without departing from the scope of the invention. With respect to the circumferential longitudinal direction, in the middle of this longitudinal direction the inner surface of each ring section 5 is provided with a cylindrical protrusion 6 or a bolt which project a certain distance from the inner surface of the ring sections 5 wherein the projection length basically corresponds to the depth of the blind holes 3 formed in the shaft 2. The protrusions 6 are arranged diametral with respect to the gimbal ring 4 being mounted to the shaft 2. The central symmetry line of the cylinder shape of the protrusions 6 coincide with each other and form a gimbal axis about which the gimbal ring 4 is tiltable relative to the longitudinal axis of the shaft 2.

In more detail, the overlapping end portions of the ring sections 5 are constructed as follows. The groove 10 is defined by a first wall laying within a plane which is normal to the longitudinal axis of the shaft 2 and dividing the cross-section of the ring section 5 in two halves. On the opposing side, the groove 10 is defined by a second wall being parallel to the first wall, the second wall being distanced halfway to the edge of the ring section 5. Further, the groove 10 is defined by a base wall laying within a plane which is normal to the gimbal axis. These three walls form the only border walls of the groove 10. The remaining cross-section of the half cross-section containing the tooth 10, is defining a protrusion projecting a certain part of the distance to the respective end of the ring section 5 and ending with a front side also laying within a plane which is normal to the gimbal axis. The tooth 11 is formed correspondingly as a staircase-shaped tooth, wherein the sides of the staircase-shape facing towards to groove 10 (it is supposed to mesh with) lay also within planes which are normal to the gimbal axis.

Further, each end portion of each ring section 5 is provided with a guiding protrusion 12. These guiding protrusions 12 project from side surfaces of the ring section 5 (the surface of the ring section 5 facing towards the adjacent swash ring 7). In more detail, the guiding protrusions 12 extend from a side of each ring section 5 in a direction opposite to the overlapping end portion of the respective other ring section 5. One of the faces of the protrusion 12 corresponds to the radially outer face of the ring section 5, another face of the protrusion 12 corresponds to the radially inner face of the ring section 5 and the two remaining faces extending in the projection direction of the protrusion 12 are within a plane which is normal to the gimbal axis. The surface of the protrusion 12 which faces the adjacent swash ring 7 is concave, i.e. the projection length is smallest in the center of the protrusion 12, such that a cross-section of the protrusion 12 along a radial direction of the gimbal ring 4 is basically U-shaped. When using the term "radial" in this description a direction is meant laying within a plane which is normal to the longitudinal axis of the shaft 2, the direction leading through the center of the cross-section of the shaft or through the center of the circular shapes of the other parts.

The two swash rings 7 are disc-shaped with an outer diameter minorally larger (1-2 mm) than the outer diameter of the gimbal ring 4 and an inner diameter a little larger than the outer diameter of the bearing portion of the shaft 2. The swash rings 7 have a basically square-shaped cross-section. On the side facing the gimbal ring 4, each swash ring 7 is provided with two recesses or cut-outs 13. The cut-outs 13 are formed diametral in the swash rings 7 wherein the side of the cut-outs 13 facing the gimbal ring 4 is convex and corresponding to the shape of the protrusions 12, i.e. the center of the cut-out 13 has the smallest depth. Also, it is possible to form the surface of the protrusion 12 which faces the opposing cut-out 13 as a flat surface, and to form the opposing surface of the cut-out 13 as convex surface. Similarly, it is also possible to form the surface of the protrusion 12 which faces the opposing cut-out 13 as a convex surface and to form the opposing surface of the cut-out 13 as a concave surface.

The protrusions 12 together with the corresponding cut-outs 13 have two functions. On one hand, they form a guiding interface between the swash rings 7 and the ring sections 5 or the gimbal ring 4. This means the protrusions 12 and the cut-outs 13 are formed such that the ring sections 5 and the swash rings 7 can be slid relative to each other in a radial direction perpendicular to the gimbal axis. This is realized by the already described faces of the protrusions 12 being normal to the gimbal axis. On the other hand, the protrusions 12 together with the corresponding cut-outs 13 form a fixation of the ring sections 5 to the shaft 2. This is realized in that the protrusions 12 and the cut-outs 13 block a relative movement between the ring sections 5 and the swash rings 7 in a radial direction along the gimbal axis or the symmetry line of the cylindrical protrusions 6. Thus, the ring sections 5 are mounted to the shaft 2 by radially attaching the ring section 5 onto the shaft 2 such that the protrusions 6 are radially inserted into the blind holes 3 and by inserting the protrusions 12 into the cut-outs 13. In this state, abutting faces of the protrusions 12 and the cut-outs 13 block the removal of the ring sections 5 in a radial direction along the gimbal axis.

Figure 3:
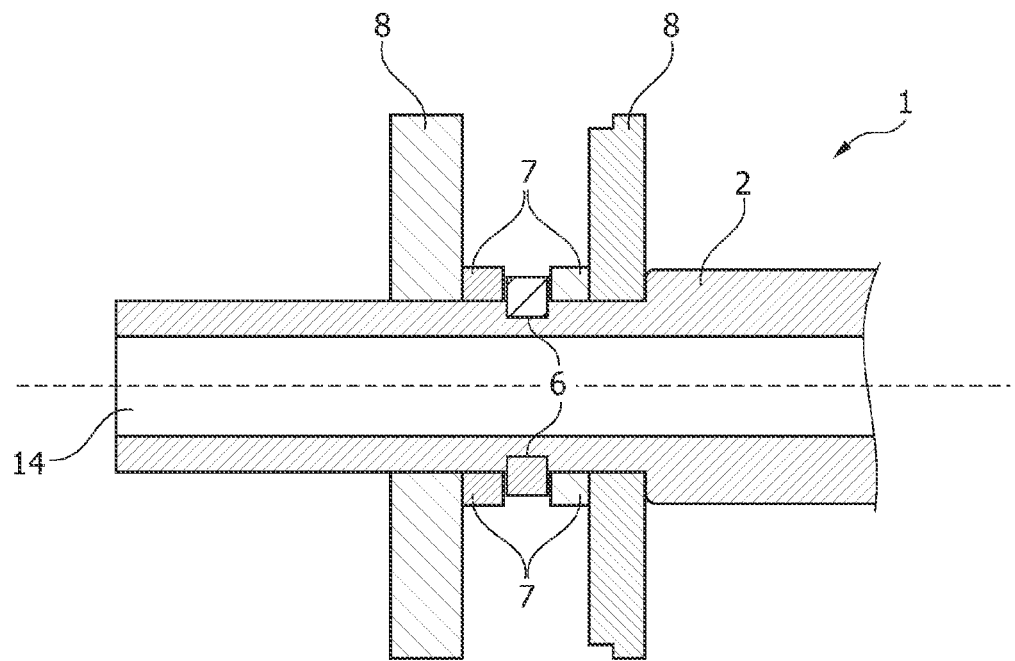
FIG. 3 is a cross-sectional view of most parts of the bearing system of FIG. 1.

FIG. 3 is a cross-sectional view of the bearing parts shown in FIG. 1, except the spacer ring 9. The cross-sectional view is shown along a plane containing the gimbal axis and the longitudinal axis of the shaft 2. From FIG. 3 it can be derived how the shape of the protrusions 6 and the shape of the blind holes 3 correspond to each other. When assembling the bearing system 1 according to this embodiment, the first outer ring 8 is slid onto the bearing portion of the shaft 2 from an outer end of the shaft 2 until the outer ring 8 abuts against a ridge forming the transition from the bearing portion to the center portion of the shaft 2. The inside of the shaft 2 is hollow, in order to form a lubricant channel 14 which is adapted to guide cooling fluid, preferably liquid as the lubricant mentioned above.

Figure 4:
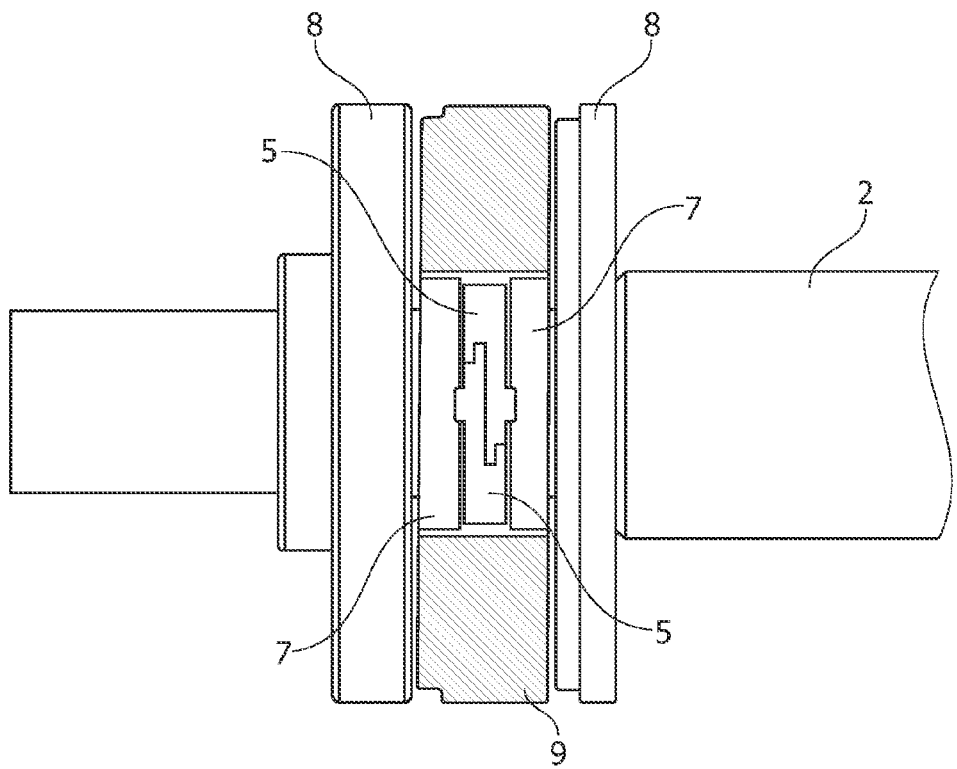
FIG. 4 is a fully assembled view of the bearing system according to an embodiment of the invention.

FIG. 4 is a top view of FIG. 2 showing all parts of FIG. 1 in their assembled state. In use, the shaft 2, the ring sections 5 and the swash rings 7 are non-rotating, whereas the outer rings 8 and the spacer ring 9 rotate with the anode disc 24 (see FIG. 5). Between the outer diameter of the shaft 2 and the inner diameter of the gimbal ring 4/swash rings 7, there is a small clearance in order to allow a minor tilting movement relative to the shaft 2. This tilting movement is also allowed by a clearance between the outer diameters of the swash rings 7 and the inner diameter of the spacer ring 9. Between the swash rings 7 and the respective opposing outer rings 8, there is a small clearance also allowing the minor tilting movement of the gimbal ring 4 and the swash rings 7 about the gimbal axis and relative to the shaft 2, i.e. the longitudinal axis of the shaft 2. Further, there is a small clearance between the side faces of the swash rings 7 and the opposing faces of the gimbal ring 4 such that the gimbal ring 4 is only in contact with the swash rings 7 via the bottom faces of the cut-outs 13 and their opposing faces of the protrusions 12. As explained above, the interfaces formed by the protrusions 12 and the cut-outs 13 allow a sliding movement in a radial direction perpendicular to the gimbal axis such that a tilting of the gimbal ring 4 relative to the longitudinal direction of the shaft 2 induces a tilting of the swash ring 7. Since these opposing contact faces of the protrusions 12 and the cut-outs 13 are convex/concave, as described above, also a small rotational relative movement between the gimbal ring 4 and the swash rings 7 is allowed, namely a rotational relative movement about a radial axis perpendicular to the gimbal axis.

These minor relative movements between the parts have the effect that a better bearing capability can achieved. The anode disc 24 is turning with a high revolution speed. Due to certain measures, like spiral grooves known from the state of the art, lubrication liquid is fed to the parts that have to be lubricated. When turning off the rotary anode, the revolution speed of the shaft 2 reduces until below a certain revolution speed (the so called "landing revolution speed") and the lubrication film breaks causing the rotating parts of the bearing to stop almost abruptly or very fast. In order to avoid a breaking of the lubrication film as long as possible, the faces sliding relative to each other have to contact each other as smooth as possible. In order to compensate for manufacturing tolerances, this is achieved by the above described relative movement of the parts of the bearing system.

Figure 5:
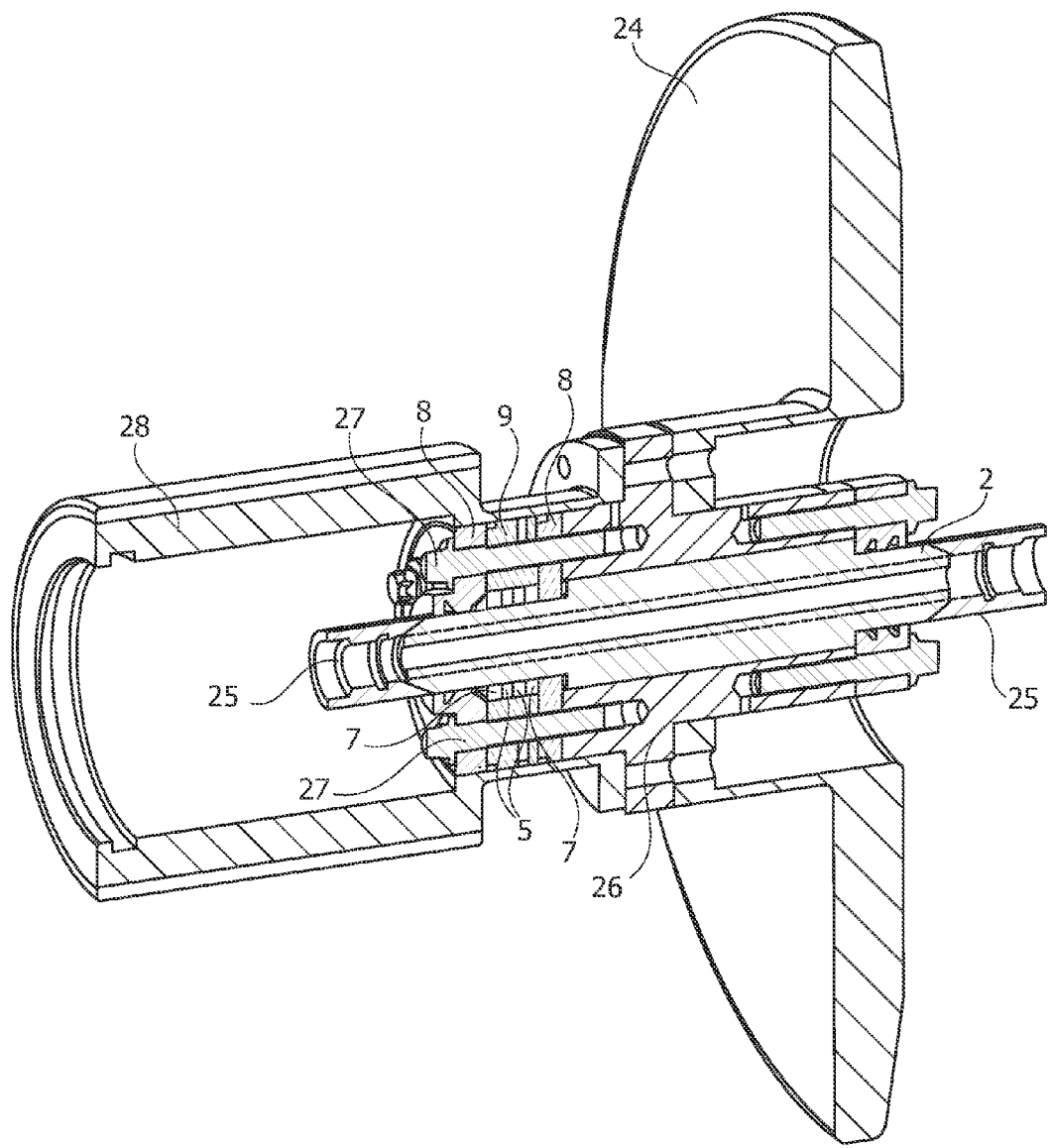
FIG. 5 shows a three-dimensional cross-sectional view of the rotary anode and the bearing system according to an embodiment of the invention.

FIG. 5 shows a three-dimensional cross-sectional view of how the bearing system 1 is connected with the anode disc 24. As mentioned above, the shaft 2 is made of molybdenum or tungsten, especially in the area where the bearings are attached, namely the bearing and center portions of the shaft 2. However, the portions 25 of the shaft 2, which are needed for installing the shaft 2 into the X-ray tube, e.g. by soldering it into the casing of the X-ray tube, are formed of steel parts or steel sheets soldered to the shaft 2. The center portion of the shaft 2 is surrounded by a radial bearing part 26 forming a radial bearing with the center portion of the shaft 2, i.e. the outer surface of the center portion and the inner surface of the radial bearing part 26 form radial bearing surfaces. The outer rings 8, the spacer ring 9 and the radial bearing part 26 are fixedly attached to each other by a screw or a bolt 27. Further, the latter mentioned parts are fixedly connected with the anode disc 24 and a rotor 28 of an electric motor for driving the anode disc 24. The anode disc 24 can be provided on the right or the left side of the axial bearing system 1. As already mentioned, in use, the shaft 2 together with the ring sections 5 and the swash rings 7 are non-rotating, whereas the outer rings 8, the spacer ring 9, the radial bearing part 26, the rotor 28 and the anode disc 24 are rotating about the shaft 2.

Figure 6:
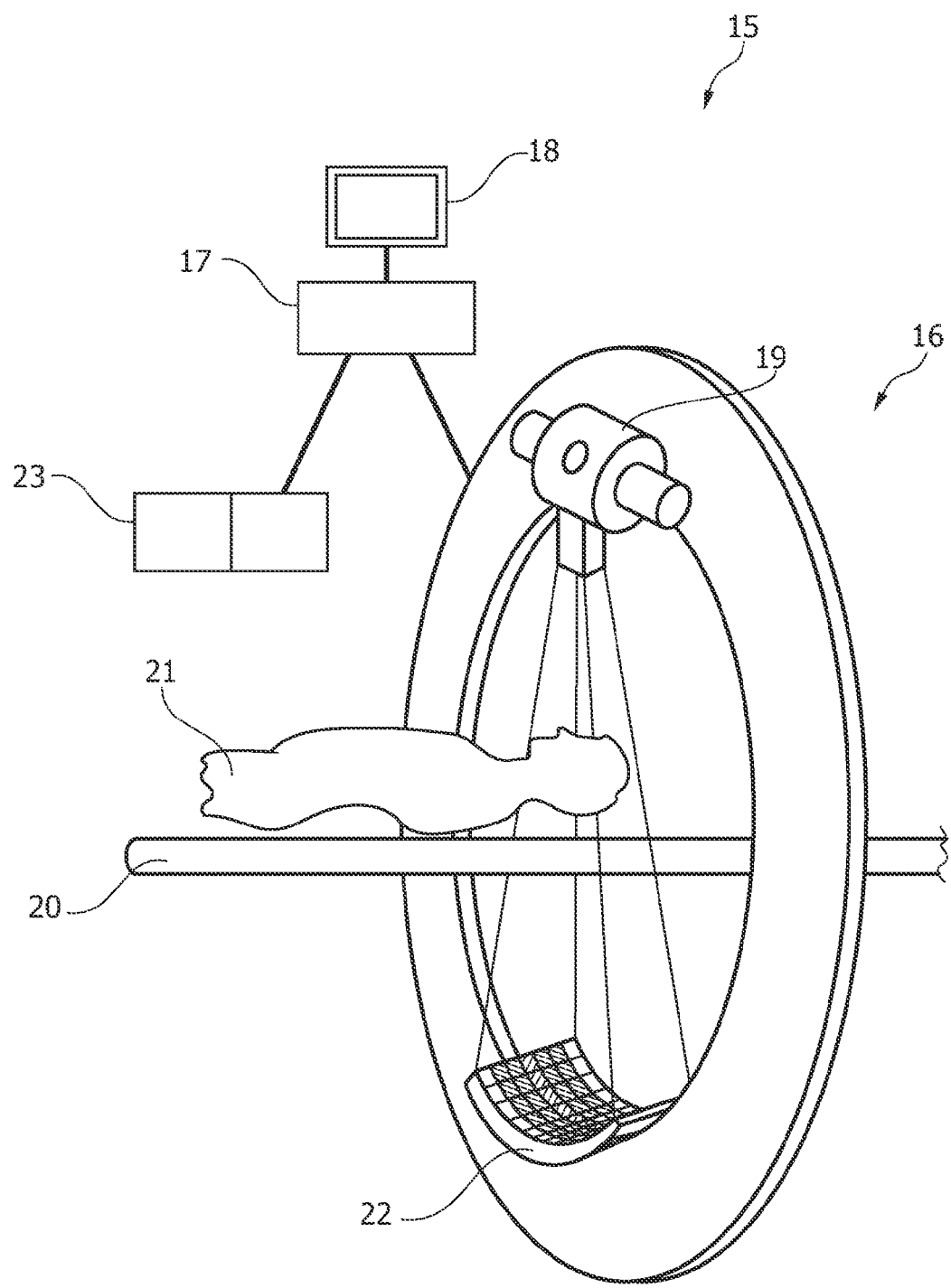
FIG. 6 schematically shows a medical imaging system according to an embodiment of the invention.

FIG. 6 schematically shows a medical imaging system 15 for generating a composite medical view/image in which the above described bearing system 1 can be used. The medical imaging system 15 comprises an image acquisition device 16, a data processing unit 17 and a display device 18. For example, the medical imaging system is an X-ray imaging system, comprising an X-ray tube 19. A table 20 is provided to receive a patient 21 to be examined. Further, an X-ray image detection module 22 is located opposite the X-ray tube 19. The latter is sending data to the data processing unit 17 which is connected to both, the detection module 22 and the X-ray tube 19. The data processing unit 17 is located in the vicinity of the table 20. Furthermore, the display 18 is arranged in the vicinity of the table 20 to display information to a person operating the X-ray imaging system. Also, an interface unit 23 is arranged to input information or commands by the user. Basically, the image detection module 22 generates image data by exposing the subject to X-ray radiation, wherein said images are further processed in the data processing unit 17. It is noted that the example shown is a so-called CT-type X-ray image acquisition device. The invention also relates to other types of X-ray image acquisition devices, such as CV-type X-ray image acquisition devices.

In the above embodiment, the protrusions 6 of the ring sections 5 are supposed to be inserted into the blind holes 3 of the shaft 2, however, it would also be possible to provide the shaft 2 with protrusions and the ring sections 5 with corresponding holes or recesses. Also, it would be possible to provide the shaft 2 and the ring sections 5 with recesses and to provide an additional bolt connecting a recess of the shaft with a corresponding recess of a ring section. Similarly, it would be possible to exchange the protrusions 12 with the cut-outs 13 such that the swash rings 7 are provided with protrusions fitting into cut-outs of the ring sections 5.

It is explicitly intended that the teaching of this invention covers any combination of the above described embodiments.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims or embodiments does not indicate that a combination of these measures cannot be used advantageously. Any reference signs in the claims should not be construed as limiting the scope of the invention.

The invention claimed is:

1. A bearing system for a rotary anode of an X-ray tube, comprising:
   a shaft for supporting the rotary anode;
   two swash rings surrounding the shaft;
   a gimbal ring surrounding the shaft and being arranged in between the two swash rings; wherein the gimbal ring is hingeably connected with the shaft such that the gimbal ring is tiltable relative to a longitudinal axis of the shaft.

2. The bearing system according to claim 1, wherein the gimbal ring is composed of two ring sections.

3. The bearing system according to claim 2, wherein the ring sections overlap at their ends when mounted to the shaft.

4. The bearing system according to claim 1, wherein the hingeable connection between the shaft and the gimbal ring is realized by providing the gimbal ring with two protrusions and providing the shaft with two corresponding blind holes.

5. The bearing system according to claim 1, wherein the shaft is hollow for guiding cooling fluid.

6. The bearing system according to claim 1,
wherein between the gimbal ring and each of the two swash rings a form-lock is provided, the form-locks allowing a shiftable relative movement between the gimbal ring and each of the swash rings in a radial direction of the gimbal ring.

7. The bearing system according to claim 6, wherein the form-locks block a relative movement in a radial direction perpendicular to the allowed shifting movement direction.

8. The bearing system according to claim 3, wherein each of the ring section is provided at each of its ends at one half of its cross-section with a tooth and at the other half of its cross-section with a groove which project in a circumferential direction, wherein the tooth of one of the ring section meshes with the groove of the other ring section when both ring sections are mounted to the shaft.

9. The bearing system according to claim 1, wherein the bearing system is a hydrodynamic bearing system.

10. An X-ray tube having the bearing system according to claim 1.

11. An imaging system having the bearing system according to claim 1.

\* \* \* \* \*